United States Patent
Rojey et al.

[11] Patent Number: 5,816,280
[45] Date of Patent: Oct. 6, 1998

[54] PROCESS FOR TRANSPORTING A FLUID SUCH AS A DRY GAS LIKELY TO FORM HYDRATES

[75] Inventors: Alexandre Rojey; Michel Thomas, both of Rueil Malmaison; Anne-Sophie Delion, Paris; Jean-Pierre Durand, Chatou, all of France

[73] Assignee: Institut Francais du Petrole, Rueil-Malmaison, France

[21] Appl. No.: 659,654

[22] Filed: Jun. 6, 1996

[30] Foreign Application Priority Data

Jun. 6, 1995 [FR] France .................................. 95 06737

[51] Int. Cl.[6] ................................................. E21B 43/12
[52] U.S. Cl. .................................................... 137/13
[58] Field of Search ............................................ 137/13

[56] References Cited

U.S. PATENT DOCUMENTS

| | | |
|---|---|---|
| 3,644,107 | 2/1972 | Clark . |
| 4,915,176 | 4/1990 | Sugier et al. ............... 137/13 X |
| 4,948,394 | 8/1990 | Rojey ............................ 55/228 X |
| 4,991,614 | 2/1991 | Hammel ........................... 137/13 |
| 5,127,231 | 7/1992 | Larue et al. ................... 62/633 |
| 5,244,878 | 9/1993 | Sugier et al. .............. 137/13 X |
| 5,351,756 | 10/1994 | Minkkinen et al. ......... 166/302 X |

FOREIGN PATENT DOCUMENTS

| | | |
|---|---|---|
| 0178962 | 4/1986 | European Pat. Off. . |
| 0323307 | 7/1989 | European Pat. Off. . |
| 0442767 | 8/1991 | European Pat. Off. . |
| 0571257 | 11/1993 | European Pat. Off. . |
| 2618876 | 2/1989 | France . |
| 88 10397 | 12/1988 | WIPO . |

*Primary Examiner*—Gerald A. Michalsky
*Attorney, Agent, or Firm*—Antonelli, Terry, Stout & Kraus, LLP

[57] ABSTRACT

Process for transporting gas hydrates formed from a natural gas or from a condensate gas, consisting in using a dispersing additive, possibly coupled with a film-forming additive, in solution in a liquid hydrocarbon fraction, this liquid hydrocarbon fraction participating in the formation of an emulsion and/or of a suspension with the condensation water produced and the hydrates. The dispersing additive is recycled after the transportation of the hydrates in the pipe.

12 Claims, 2 Drawing Sheets

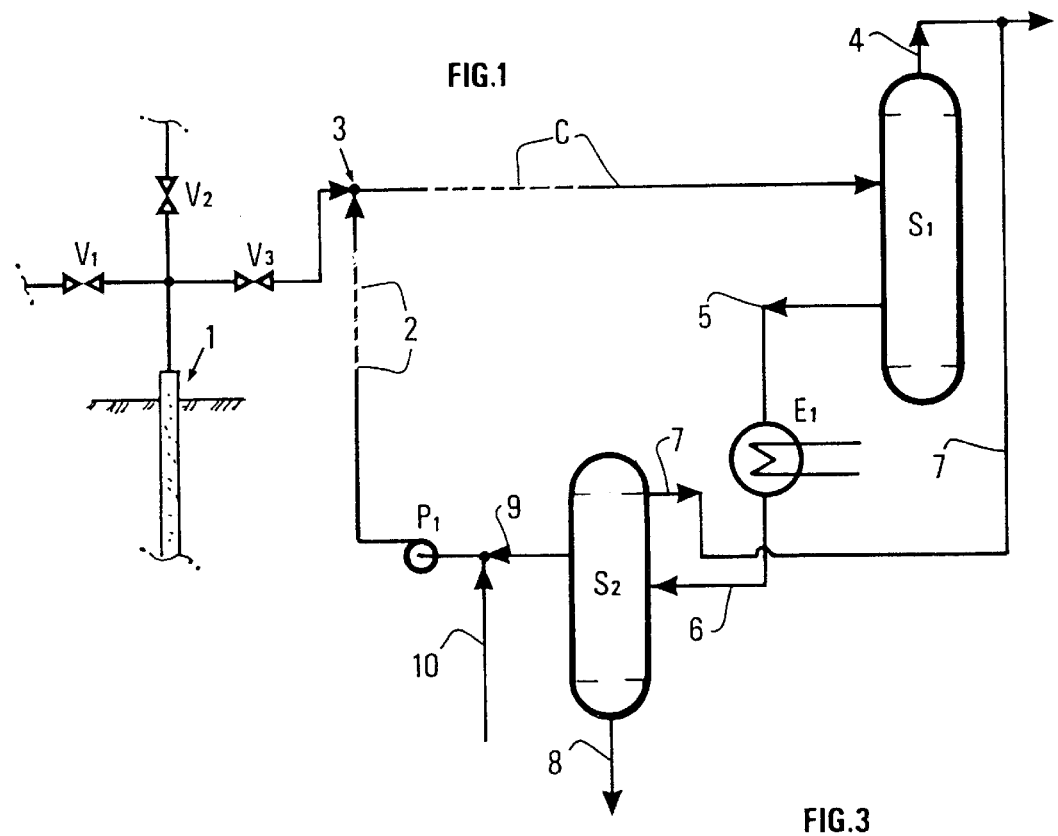
FIG.1
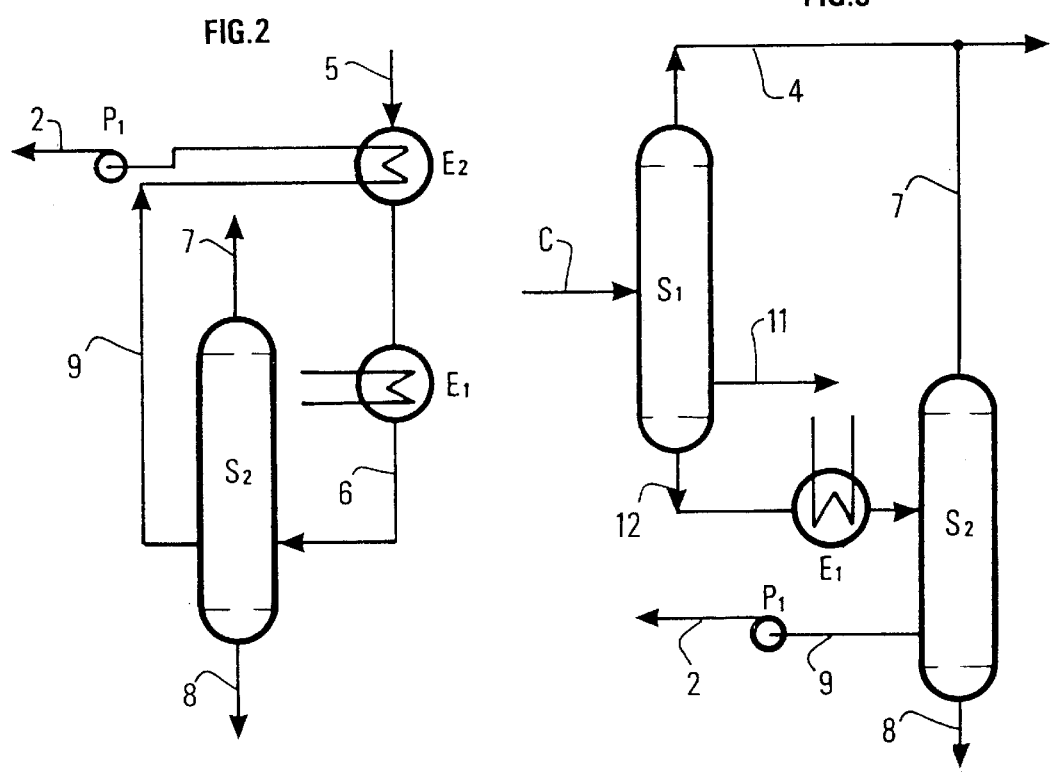
FIG.2
FIG.3

PROCESS FOR TRANSPORTING A FLUID SUCH AS A DRY GAS LIKELY TO FORM HYDRATES

FIELD OF THE INVENTION

The present invention relates to a process allowing the transportation, in a pipe, of a fluid containing at least a gas phase such as gaseous hydrocarbons and water under conditions where hydrates may form, by adding a liquid phase, for example a liquid hydrocarbon fraction containing at least a dispersing additive, so as to ensure the transportation of the hydrates possibly formed and/or by recycling at least partly the liquid hydrocarbon phase containing the additive or additives.

The present invention is notably suited for the transportation, under thermodynamic conditions where hydrates may form, of a natural gas or of a condensate gas, water, and the hydrates possibly formed.

The present invention may also apply to the transportation of a fluid for which the values of the ratio of the gas phase to the liquid phase, usually referred to as GLR (Gas Liquid Ratio) or GOR (Gas Oil Ratio), are high.

BACKGROUND OF THE INVENTION

In fact, hydrates may form when water is in the presence of light hydrocarbons, either in the gas phase or dissolved in a liquid phase, such as a liquid hydrocarbon, and when the temperature reached by the mixture becomes lower than the thermodynamic hydrate formation temperature, this temperature being given for a given gas composition and pressure value.

Hydrate formation can be feared notably in the petroleum and gas industry where hydrate formation conditions can be met. In fact, in order to decrease the production cost of crude oil and gas, as regards investment as well as development, one of the means considered, notably in offshore production, consists in reducing or even doing away with the processings applied to the crude oil or to the gas to be transported from the reservoir to the coast, and notably in keeping all or part of the water in the fluid to be transported. Offshore processings are generally performed on a platform situated at the surface close to the reservoir, so that the effluent, initially hot, can be processed before the thermodynamic hydrate formation conditions are reached as a result of the cooling of the effluent circulating in a pipe in indirect contact with sea water. This procedure is particularly advantageous when offshore production is performed in a zone that is difficult of access. However, the major drawback thereof lies in the risks of hydrate formation due to the presence of water.

In fact, petroleum effluents containing a gas phase and possibly a liquid phase can consist, for example, of a natural gas, a condensate gas or an associated gas mixed with crude oil. They are generally water-saturated and they may even contain free water in some cases.

During the transportation of production effluents from an underwater natural gas or oil and gas reservoir, containing water, the sea bottom temperature can be of the order of 3° or 4° C. Such a temperature leads to a fall in the temperature of the effluent produced, which can bring the latter into thermodynamic conditions likely to lead to to the formation of hydrates, that agglomerate and block production pipes.

Hydrates are inclusion compounds formed from water and light hydrocarbons such as methane, ethane, propane, iso or n-butane. Nitrogen, as well as certain acid gases present in natural gas, such as carbon dioxide or hydrogen sulfide, can also form hydrates in the presence of water.

The formation, then the agglomeration of hydrates lead to the filling and to the clogging of transmission pipes, which eventually prevents passage of oil or gas and has extremely serious consequences. In fact, these phenomena can lead to production stops and to considerable financial losses. Furthermore, restarting the facility, notably in the case of offshore production or transportation, can be long since the decomposition of the hydrates formed is very difficult to achieve.

Conditions favourable to the formation of hydrates can also be met in the same way onshore, for pipes buried near the ground surface for example when the temperature of the ambient air is quite low, notably in northern zones such as arctic zones.

In order to avoid such drawbacks, one has tried in the prior art to use products that, added to the fluid, act as inhibitors by lowering the thermodynamic hydrate formation temperature. These are notably alcohols, such as methanol, or glycols, such as mono-, di- or triethylene glycol. This solution is very costly since the amount of inhibitors to be added can reach 10 to 50% by weight of the water content and these inhibitors are difficult to recover completely.

It has also been recommended to insulate or even to heat transmission pipes by means of a suitable device, such as described in patent application WO-90/05,260, in order to prevent too fast a cooling of the fluids transported. Such devices are nevertheless expensive and complex as far as their technical realization is concerned.

Other means consist in using radiations, for example, patent HU-18,511 teaches to send an electromagnetic wave whose frequency values and modes of propagation are selected to cause the hydrates formed to melt.

In patent SU-442,287, an ultrasonic wave is used to break the hydrate crystals and to release the trapped gas.

The use of additives capable of modifying the hydrate formation mechanism has also been described, where the hydrates formed disperse in the fluid without agglomerating and without clogging the pipes rather than quickly agglomerate with each other and form very solid plugs. The applicant's patent application EP-A-323,774 can be cited in this respect, which describes the use of non-ionic amphiphile compounds selected from the polyol and carboxylic Is acid esters, substituted or non-substituted, and the imide function compounds. The applicant's patent application EP-A-323,775 can also be cited, which notably describes the use of compounds belonging to the fatty acid or fatty acid derivative diethanolamides family. U.S. Pat. No. 4,956,593 describes the use of surface-active compounds such as organic phosphonates, phosphate esters, phosphonic acids, their salts and their esters, organic polyphosphates and their esters, as well as polyacrylates and polyacrylamides. Patent application EP-A,457,375 describes the use of anionic surface-active compounds such as alkylsulfonic acids and their alkali metal salts. Amphiphile compounds obtained by reaction of at least one succinic derivative, selected from the group consisting of the amides and the polyalkenylsuccinic anhydrides, on at least one polyethyleneglycol monoether have also been proposed to reduce the agglomeration tendency of gas hydrates in patent application EP-A-582,507.

Methods advocating the use of dispersing agents for transporting hydrates or for reducing the agglomeration tendency thereof are particularly advantageous when the amount of liquid hydrocarbon phase, oil or condensate, is such that the formation of a water-in-oil emulsion is possible. The liquid hydrocarbon phase serves in fact as a carrier for the further transportation of the hydrates suspension and a minimum amount of this phase is required.

It is thus possible to use this technique for the transportation of a fluid, for example condensate gases, or oil with associated gas, since in both cases the presence of a liquid hydrocarbon phase is guaranteed in the production pipe (for example produced by condensation upon transportation and/or present in the fluid), from the wellhead to the separator or to the terminal.

On the other hand, this method cannot be used for fluids having high GLR values, or dry gases, since for such effluents there is no condensation of a liquid hydrocarbon phase under the pressure and temperature conditions encountered during transportation. A dry gas nevertheless contains water, generally in the vapour state, then partly in the liquid state as a result of its progressive condensation due to the temperature decrease in the pipe. This liquid water can then lead to the formation of hydrates when it is in the presence of a gas phase and for given thermodynamic conditions.

This method also produces bad results for condensate gases with very high gas-oil ratio values that are not likely to produce sufficient condensate amounts to ensure the transportation of the hydrates possibly formed.

It is therefore interesting to have a method allowing to transport a fluid likely to form hydrates and to prevent agglomeration of the hydrates, more particularly applied to the transportation of dry gases or of condensate gases that are not very rich in condensates.

SUMMARY OF THE INVENTION

The present invention is thus aimed at providing a simple means allowing to use conventional hydrate-dispersing agents in the case of dry gases for which there is no condensation of a liquid hydrocarbon phase, or in the case of condensate gases for which the amount of condensate produced remains lower than the amount of water produced.

It has been discovered that it is advantageous to introduce the hydrate-dispersing additive in solution in a liquid phase such as a liquid hydrocarbon fraction, the liquid hydrocarbon fraction being introduced in sufficient amounts to obtain a dispersion of the liquid water present.

In fact, by selecting judiciously the amount of liquid hydrocarbon fraction in relation to the water fraction present in the fluid, the additive can disperse the water as well as the hydrates possibly formed in the liquid hydrocarbon phase, ensuring thereby the transportation thereof in the disperse form.

It is advantageously possible to select the composition of the hydrocarbon phase for example by choosing a mixture of hydrocarbons with a sufficiently low vapour pressure or dew-point pressure, so that this hydrocarbon fraction can exist totally or partly in the liquid state in the pipe.

It will thus be possible, by judiciously selecting the composition of this liquid hydrocarbon fraction and the amount thereof fed into the pipe in relation to the amount and to the composition of the gas produced, to control the amount of liquid hydrocarbon phase at a given point of the pipe, as a function of the pressure and temperature conditions and of the amount of water likely to condense under these conditions.

In the description, the expressions "the additive or additives" or "dispersing additive" refer to one or more mixed additives, for example, and injected into the fluid.

The present invention relates to a process for transporting in a pipe a fluid containing at least a gas phase such as gaseous hydrocarbons and water, under conditions where hydrates may form, the hydrates being formed from the water and the gas. It is characterized in that a mixture containing a liquid phase such as a liquid hydrocarbon fraction and additives in solution in the liquid fraction is incorporated to said fluid, the amount or proportion of the liquid phase being selected so as to disperse the liquid water present in the fluid.

The ratio of the hydrocarbon fraction to the amount of liquid water advantageously ranges between 1 and 20.

An amount of additive can be added to the liquid hydrocarbon fraction so as to obtain a concentration ranging between 0.01 and 4% by weight.

According to a mode of implementation of the process, the mixture consisting of the liquid hydrocarbon fraction and of the additives in solution is separated and recycled for example at least partly to a point of the pipe. Recycling can preferably be performed at the pipe head.

Separation can be performed for example as follows:

(1) the mixture consisting of the dispersing additive in solution in said liquid hydrocarbon fraction is fed into the transmission pipe, and the liquid on hydrocarbon fraction can be vaporized at least partly in the gas phase, (2) the mixture comprising a gas phase, the water contained in the fluid, the mixture added and possibly the hydrates formed is transported to a processing station, (3) at the pipe outlet, the mixture is separated as follows: the gas phase is at least partly separated from the rest of the mixture comprising the liquid hydrocarbon fraction and the additives in solution, the hydrates possibly formed during transportation and the water, the hydrates formed are dissociated so as to obtain a gas phase and an aqueous phase, then, after dissociation, the gas phase and the aqueous phase are separated from the liquid hydrocarbon phase containing the additive, (4) at least part of the liquid hydrocarbon phase containing the additive from stage (3) is recycled back to a point of the pipe.

For fluids likely to form an excess liquid phase, for example condensate gases, the liquid hydrocarbon fraction can be separated in two stages:

by obtaining, at the end of the first stage, on the one hand, a water-concentrated suspension or emulsion and a liquid hydrocarbon fraction substantially cleared of water that is discharged, and by separating during a second stage the water contained in the emulsion or the suspension from the first stage from a liquid fraction enriched in dispersing additive and by recyling at least partly said liquid hydrocarbon fraction.

A dispersing additive such as a polyol and carboxylic acid ester, substituted or non-substituted, is used.

The polyol ester can be formed between an alkenylsuccinic acid or anhydride and a polyalkyleneglycol; and/or between a polyisobutenylsuccinic anhydride and a polyethyleneglycol; and/or obtained by action of polyalkyleneglycol monoether and of polyisobutenylsuccinic anhydride.

The dispersing additive can be a carboxylic acid hydroxycarbylamide, substituted or non-substituted, such as an aliphatic or cyclanic hydroxycarbylamide and/or a carboxylic acid mono- or diethanolamide containing preferably 3 to 36 carbon atoms.

According to an embodiment of the invention, an additive is used together with a conventional thermodynamic inhibitor, such as methanol or the glycols.

A mixture made up of a liquid hydrocarbon fraction and of an additive making the wall of the pipe wettable by said liquid hydrocarbon fraction can be fed into the pipe.

The additive making the wall of the pipe wettable by the liquid hydrocarbon fraction can be at the same time an anticorrosion additive.

A liquid hydrocarbon fraction comprising constituents whose number of carbon atoms ranges between 5 and 30, or a condensate, or a crude oil distillation cut is for example injected.

The process according to the invention is particularly well suited for transporting a condensate gas or a natural gas likely to form hydrates.

BRIEF DESCRIPTION OF THE DRAWINGS

Other features and advantages of the present invention will be clear from reading the description hereafter, given by way of non limitative examples, with reference to the accompanying drawings in which:

FIG. 1 illustrates a flowsheet allowing the invention to be implemented,

FIG. 2 shows a detail of an embodiment variant allowing the heat consumption to be reduced during the process, FIG. 3 shows a separation procedure that is well-suited to condensate gases.

DESCRIPTION OF THE PREFERRED EMBODIMENTS

Figure 4:
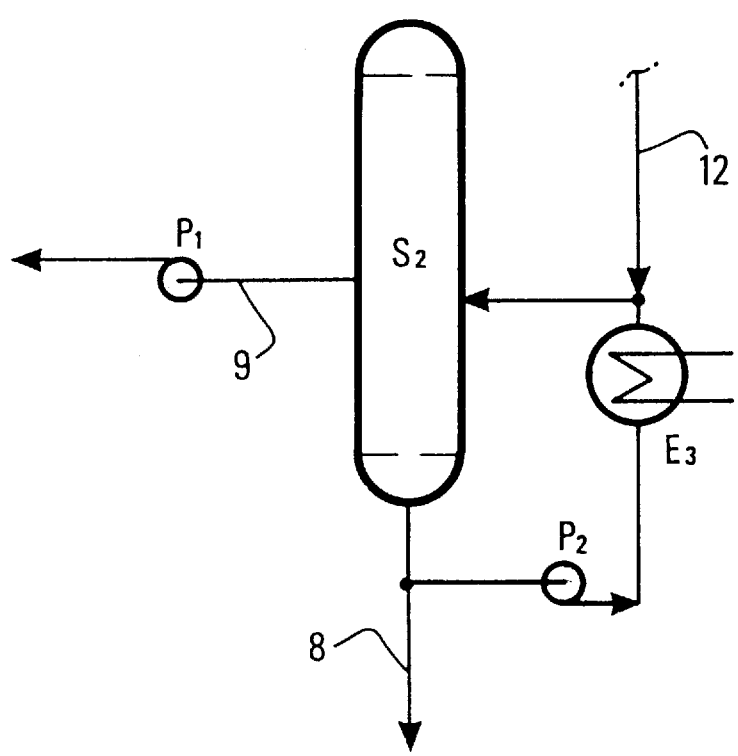
FIG. 4 shows another possibility of melting the hydrates.

The principle implemented in the process according to the invention consists in injecting a mixture made up of a liquid phase, for example a liquid hydrocarbon phase, and of an additive into a fluid likely to form hydrates under given thermodynamic conditions, the fluid flowing in a pipe.

The function of the additive is notably to disperse the hydrates possibly formed and the amount of liquid hydrocarbon phase is selected in relation to the proportion of liquid water present in the fluid so as to obtain a substantially total dispersion of the water present and to ensure the transportation of the hydrates possibly formed.

It is advantageously possible to recycle at least part of the mixture consisting of the liquid hydrocarbon fraction containing the additive or additives.

In order to better define the principle implemented in the process according to the invention, the example described in connection with FIG. 1, given by way of non limitative example, is applied to the transportation of a water-saturated dry gas such as a production effluent, containing hydrates formed under specific thermodynamic conditions.

The water-saturated dry gas is discharged from the subsoil at 1 through a wellhead that can be a subsea wellhead in the case of an offshore reservoir. The wellhead is schematized in FIG. 1 by means of a valve manifold $V_1$, $V_2$, $V_3$. After coming out of the wellhead, the effluent, at a relatively high temperature of the order of 70° C. for example, passes through a pipe C in order to be transported to an onshore processing station A or to a production platform provided with the equipments commonly used for processing in the petroleum industry. During its transportation in pipe C, the dry gas is progressively cooled as a result of the indirect contact of the pipe with the sea water, which leads to the formation of hydrates, especially in the neighbourhood of the wall. Agglomeration of these hydrates can eventually progressively block pipe C.

In order to prevent the formation of a hydrates plug, the process according is to the invention consists in feeding into a pipe 2 connected to pipe C, at least at one point 3, or injection point, a mixture containing a liquid phase such as a liquid hydrocarbon fraction and a dispersing additive in solution in the liquid fraction. This mixture injected at point 3 can be partly vaporized in contact with the gas.

An amount of liquid hydrocarbon fraction in relation to the water present in the dry gas is preferably injected in a proportion ranging from 1 to 5 and preferably from 1 to 20.

The additive concentration in the liquid hydrocarbon fraction preferably ranges between 0.01 and 4% by weight, which substantially corresponds to a concentration ranging between 0.1 and 4% by weight in relation to the water produced.

Dispersion of the aqueous phase is obtained thereby and this dispersion is maintained throughout the transportation in the pipe. When hydrates form, the hydrate particles are thus carried along in the two-phase flow.

In order to prevent risks of agglomeration of the hydrate particles, a dispersing additive is used that is preferably at least partly made up of molecules that adsorb on the surface of the hydrate crystals and prevent the particles from moving closer, for example by steric effect.

The mixture containing the liquid hydrocarbon phase and the additive is advantageously recycled as described hereunder for example.

The effluent transported in pipe C comprises the dry gas, the mixture of liquid hydrocarbon and additives and possibly the hydrates formed during transportation. When it reaches platform A, it is fed into a separator $S_1$ for example in which the gas phase and the liquid hydrocarbon phase containing the hydrates in suspension are separated. The gas phase is discharged through a pipe 4 preferably situated at the top of the separator and the liquid hydrocarbon phase containing the hydrates in suspension and the additive is discharged through a pipe 5 situated in the lower part of the separator.

The mixture coming from pipe 5 is fed into an exchanger $E_1$ where it is heated so as to dissociate the hydrate crystals, for example by fusion, in order to obtain a gas phase and a liquid aqueous phase resulting from this dissociation. After leaving this exchanger, the mixture consisting of the dissociated hydrates, the liquid hydrocarbon and the additives in solution is fed through a pipe 6 into a second separator $S_2$ in order to be separated. The gas phase or gaseous hydrocarbons are discharged at the top of the separator through a pipe 7 in order to be mixed again, for example, with the gas phase that is discharged through pipe 4. The aqueous phase is discharged through a pipe 8 situated in the lower part of the separator and the liquid hydrocarbon phase containing a major fraction of the dispersing additive that is preferably soluble in this phase is discharged through pipe 9 connected to injection pipe 2. The mixture consisting of the liquid hydrocarbon and of the additive is advantageously recycled back to pipe 2 for example by passing through a pump $P_1$ so as to bring the recycled mixture to a pressure substantially equal to the pressure of the effluent circulating in the pipe.

A fraction of this liquid hydrocarbon phase can be vaporized in the gas phase that is discharged through pipes 4 and 7.

The temperature brought into play in the exchanger ranges for example between 30° and 100° C. and preferably between 50° and 80° C.

According to another embodiment, it is possible to dissociate the hydrates wholly or partly at the level of separator $S_1$. To that effect, such pressure and temperature conditions are set that the hydrates formed during transportation are unstable.

A water-in-oil emulsion is thus obtained, that decants progressively in the bottom of separator $S_1$. The temperature must be controlled to avoid breaking the emulsion. The dispersing additive is then preferably in the emulsified phase thus produced.

The emulsified phase containing the additives is discharged through pipe towards exchanger $E_1$ where it is heated so as to break it prior to be fed into separator $S_2$ in which the emulsified phase is separated into an aqueous phase discharged through pipe 8 and a liquid hydrocarbon phase containing a large part of the additives preferably soluble in this phase, that is discharged through pipe 9 and possibly recompressed by pump $P_1$ in order to be recycled as described above.

In the two embodiments described above, makeup dispersing additive, possibly in solution in a liquid hydrocarbon fraction, intended to compensate for possible losses, can also be fed into a pipe 10.

According to an advantageous embodiment of the invention, the heat consumption in exchanger $E_1$ can be reduced.

FIG. 2 shows a pattern according to which the liquid hydrocarbon fraction discharged through pipe 9 can be thermally exchanged with the mixture discharged through pipe 5 in an exchanger $E_2$ situated before exchanger $E_1$. During this exchange, the liquid hydrocarbon fraction gives part of its energy up to the effluent discharged through pipe 5. After passing through exchanger $E_2$, this cooled liquid hydrocarbon fraction is recompressed by pump $P_1$ and recycled through pipe 2, for example, to the top of pipe C.

FIG. 3 shows an embodiment example that is particularly well-suited for fluids such as condensate gases that generate a liquid hydrocarbon fraction, and the latter can be an excess fraction in relation to the liquid water. It can take for example the form of a condensate.

It is then possible and advantageous to recycle only part of the condensate in order to concentrate the additive.

This can be performed for example as follows:

The mixture circulating in pipe C, made up of the condensate gas, the liquid hydrocarbon and the additive, and the hydrates formed, flow into separator $S_1$ where the hydrate particles sediment in the bottom of the separator. It is then possible to discharge, through pipe 11, a clear condensate phase that constitutes the condensate discharged at the same time as the gas and, through pipe 12, a suspension concentrated in hydrate particles that is fed into exchanger $E_1$. The suspension is heated in exchanger $E_1$ so as to obtain the melting of the hydrates and the breaking of the water/condensate emulsion or liquid hydrocarbon fraction likely to form after dissociation of the hydrates. The dispersing additive being preferably at the surface of the hydrate particles, it is thus possible to concentrate a major part of this additive in the liquid hydrocarbon phase that is separated in separator $S_2$, discharged through pipe 9 and recycled by means of pump $P_1$.

The gas phase is discharged through pipe 7, possibly towards pipe 4, whereas the aqueous phase leaves the separator through pipe 8.

Various means can be used to improve the performances of the various separation and recycling stages performed.

In the case of the example illustrated in FIG. 3, a concentrated suspension of hydrate particles is obtained by simple decantation in separator $S_1$. It is also possible to implement other known methods for concentrating a suspension such as, for example, passing through a cyclone, centrifugation, filtration and notably tangential filtration.

It is also possible to concentrate this suspension by heating so as to vaporize the hydrocarbon fraction that is to be discharged with the gas.

The heating performed for example in exchanger $E_1$, in the case of the examples illustrated by FIGS. 1, 2, 3, allows to melt the hydrate crystals and facilitates the separation of the emulsion by temperature rise. This heating can be achieved with other means than those illustrated in FIGS. 1, 2 and 3. It is notably possible to supply the necessary heat by not heating directly the suspension and by heating a fraction of one the fluids obtained after separation, that is recirculated.

Thus, for example, as shown in the embodiment example illustrated by FIG. 4, the suspension flowing in through pipe 12 can be mixed with an aqueous phase fraction coming from separator $S_2$, recirculated by means of pump $P_2$ and heated in an exchanger $E_3$. This design notably presents the advantage of facilitating the design of the heating exchanger and of reducing the surface thereof thanks to the good heat transfer properties of water.

In the case of the examples illustrated in FIGS. 1, 2 and 3, the two phases forming the emulsion are separated in the separator by simple decantation. Various well-known methods can be implemented in order to facilitate this separation: passing through a coalescent bed, centrifugation, passing through a cyclone, membrane techniques, electrocoalescence. This separation can also be facilitated by adding a demulsifying additive.

Without departing from the scope of the invention, the separation stages described above can be carried out in a single device combining functions substantially identical to those obtained with the assembly comprising separators $S_1$, $S_2$ and exchanger $E_1$.

In all the embodiments described above, the additives can be selected from the additives that are commonly used for inhibiting the formation of hydrates and/or the agglomeration thereof.

The dispersing additive can be, for example, a non-ionic surfactant selected from hydrogenated amidic compounds described in the applicant's patent EP-A-323,775.

The synthesis of these hydroxycarbylamides can be achieved from fatty acids, esters of these fatty acids, vegetable or animal oils or fats, by reacting these compounds with hydroxycarbylamines such as diethanolamine or monoethanolamine. What is referred to as "hydroxycarbyl" is a hydrocarbyl radical substituted by at least one hydroxy group.

The carboxylic acids of the amides can be saturated or unsaturated linear acids, present as they are or in admixture in bonded form in the oils, the esters, in the mixture of fatty acids serving as base material for the amides. The commonest usable oils are for example colza, copra, sunflower oils.

The carboxylic acids of the amides can be hydroxycarboxylic acids, such as ricinoleic acid, or estolides such as ricinoleic acid estolides.

The carboxylic acids can be diacids or triacids corresponding to the dimers and the trimers of the fatty acids or to dicarboxylic acids such as dodecanedioic acid.

The amines used with the carboxylic acids for the synthesis of the amides are for example alkanolamines or amine diols, such as diethanolamine, diisopropanolamine or trihydroxymethylaminomethane.

The amides can be carboxylic acid mono- or diethanolamides and can contain 3 to 36 carbon atoms.

The dispersing additive can be, for example, a non-ionic amphiphile compound selected from the polyol esters, substituted or non-substituted, such as those described in the applicant's patent EP-A-323,774.

These esters are for example obtained from linear or non-linear (for example branched) carboxylic acids, saturated or unsaturated, corresponding for example to the fatty acids contained in vegetable and animal oils or fats, such as for example lauric, palmitic, stearic acids for the saturated acids or palmitoleic, oleic, linoleic acids for the unsaturated acids.

The carboxylic acids can also be diacids or triacids, corresponding to the dimers or trimers of the fatty acids, or dicarboxylic acids, such as for example dodecanedioic acid for which one of the acid functions can be free.

The carboxylic acids can be hydroxycarboxylic acids such as ricinoleic acid.

The carboxylic acids can for example have the form of polymers such as the estolized acids obtained from the castor-bean plant.

Finally, the polyol esters can be obtained from alkenylsuccinic acid or from alkenylsuccinic anhydride. The alkenyl group of the acid or of the anhydride can derive from a polymer of a mono-olefin containing 2 to 5 carbon atoms. This polymer can be, more specifically, a polyisobutene in which the alkenyl group has an average molecular weight of 300 to 5000.

The polyols are for example:

diols, such as ethyleneglycol, the polyalkyleneglycols, such as polyethyleneglycol or polypropyleneglycol, or neopentylglycol, triols, such as glycerol or trimethylolpropane, tetrols, such as pentaerythritol, erythritol, polyols, such as sorbitol, mannitol, the polyglycerols, or sugars such as saccharose, glucose, fructose or derivatives of these different products such as starch.

The dispersing additive can also be a non-ionic amphiphile compound obtained by reaction of at least one succinic derivative selected from the group consisting of the polyalkenylsuccinic acids and anhydrides, on at least one polyethyleneglycol monoether such as those described in the applicant's patent EP-A-582,507.

The succinic derivatives used to prepare the compounds used in the invention are for example obtained by action of at least one olefin or of a chlorinated hydrocarbon on maleic acid or anhydride. The olefin or the chlorinated hydrocarbon used in this synthesis can be linear or branched, and contain usually 10 to 200 carbon atoms, preferably 15 to 150 carbon atoms and most often 20 to 100 carbon atoms in their molecule. This olefin can also be an oligomer, for example a dimer, a trimer or a tetramer, or a polymer of a lower olefin, having for example 2 to 12 carbon atoms, such as ethylene, propylene, isobutene. The chlorinated hydrocarbon can be obtained from the chlorination of such polymers.

The polyethyleneglycol monoethers used to prepare the compounds used in the invention usually have a number average molar mass ranging between 100 and 6000, and they meet the general formula as follows:

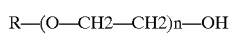

R—(O—CH2—CH2)n—OH where R is a hydrocarbon-containing group having for example 1 to 30 carbon atoms and n, representing the degree of polymerization, has a value ranging between 2 and 140.

The hydrocarbon phase can be at least partly separated and recycled. The additive used being preferably soluble in the hydrocarbon phase, it can thus be at least partly recycled, which is particularly advantageous since the additive consumption can be very substantially reduced.

According to a preferred embodiment, the formation of hydrate crystals on the wall, that might adhere to the wall and not be carried along by the flow, is prevented. To that effect, the wall of the pipe is for example made wettable by the liquid hydrocarbon fraction and non-wettable by water by incorporating for example to the liquid hydrocarbon fraction an additive that adsorbs on the wall while covering the latter with oleophilic functional groups.

This additive can advantageously consist of an anticorrosion additive, which simultaneously allows to protect the pipe against corrosion and against risks of clogging by the hydrates.

It can also consist of a mixture of additives, and what is referred to as a dispersing additive hereafter is either a single additive or a mixture of additives.

It is also possible to make the wall of the pipe from a material wettable by the liquid hydrocarbon fraction or to use an inner lining, for example Teflon, reducing the risk of adhesion of the hydrates to the wall.

The water content of a natural gas remains low and depends both on the pressure and on the temperature conditions. Since the gases initially contain water in the vapour state, the latter is likely to condense with a temperature decrease in the pipe. Under the conditions that are generally encountered during production, it is of the order of some grams of liquid water to one standard cubic meter of gas.

The amounts of water likely to condense being low, it is not necessary to introduce a large amount of hydrocarbons in the liquid phase. Generally speaking, the amount to be introduced is such that the liquid water/liquid hydrocarbon ratio is of the order of 0.3. The amount of hydrocarbon in the liquid phase to be injected is of course all the lower as the latter is heavier.

This mixture of hydrocarbons in the liquid phase can be a condensate such as those obtained upon the production of condensate gases. It can also be a crude oil distillation cut. It contains hydrocarbons whose number of carbon atoms ranges for example between 5 and 30 and preferably between 5 and 20.

According to a mode of implementation of the process, it is possible to select a liquid hydrocarbon fraction in such a way that this liquid hydrocarbon fraction is totally or partly vaporized in the gas phase under the conditions prevailing at the injection point.

Still according to a mode of implementation of the process, it is possible to select a liquid hydrocarbon fraction in such a way that this liquid hydrocarbon fraction has a dew point close to that of water under the temperature conditions encountered in the pipe.

Other features and advantages of the present process will be clear from reading the description hereafter of a non limitative example.

Consider a natural gas having the molar composition as follows

C1=85.3%, C2=5.8%, C3=5.3%, i-C4=0.7%, n-C4=1.4%, N2=1.0% and CO2=0.5%, produced in a pipe whose wellhead conditions are 15 MPa and 70° C.

Under such conditions, the water content of the gas (specific gravity=19.48/29=0.672) is about 2.5 m$^3$/MSm$^3$ of gas, i.e. about 6 m$^3$ of water to 100 Mmoles of gas produced.

If one considers that the conditions in the transmission pipe are for example 4° C. and 4 MPa, the maximum water content of the gas is of the order of 0.2 m$^3$/MSm$^3$ of gas. One may therefore consider that all of the water has condensed.

On the assumption that the amount of liquid hydrocarbon must represent for example ⅘ of the amount of liquid water produced so that a stable water-in-oil emulsion allowing transportation of the hydrates in suspension can be formed, the amount of hydrocarbon solvent to be introduced will be such that the amount of liquid hydrocarbon condensed in the pipe represents about 24 m$^3$ to 100 Mmoles of gas under production conditions.

Under production conditions with 4 MPa and 4° C., addition of 0.1% by mole of a liquid hydrocarbon of average molar mass 210 and of density 0.77 g/cm$^3$ leads to the formation of 50 m$^3$ of a liquid hydrocarbon phase to 100 Mmoles of gas produced. The water content in the liquid phase is thus about 11% by volume.

Under the same conditions, addition of 0.05% by mole of the same liquid hydrocarbon leads to the formation of 26 m$^3$ of a liquid hydrocarbon phase to 100 Mmoles of gas produced. The water content in the liquid phase is thus about 19% by volume.

Under the same conditions, addition of 0.01% by mole of the same liquid hydrocarbon leads to the formation of 5.3 m$^3$ of a liquid hydrocarbon phase to 100 moles of gas produced. The water content in the liquid phase is thus about 53% by volume.

The amount of hydrate-dispersing additive to be introduced into the liquid hydrocarbon fraction must be so adjusted that the additive content in relation to the water produced ranges for example between 0.1 and 4% by weight. This additive content in the liquid hydrocarbon fraction can vary as a function of the ratio of the liquid hydrocarbon and water phases. It nevertheless ranges for example between 0.01 and 4% by weight.

An additional advantage of this mode of introduction is the reduction in the additive viscosity.

This invention mainly applies to the transportation of hydrates formed from water and gas. This gas, that can be natural gas, petroleum gas or any other gas, can notably contain for example methane, ethane, ethylene, propane, propene, n-butane, i-butane, H$_2$S, CO$_2$ or nitrogen.

We claim:

1. A process for transporting in a pipe a fluid containing at least a gas phase and water, under conditions where hydrates may form from the water and the gas, the fluid being a dry gas or having a high GLR value such that an amount of condensate of a liquid hydrocarbon phase is insufficient to transport the hydrates, the process comprising incorporating in the fluid a mixture comprising a liquid hydrocarbon fraction and a dispersing additive in solution in the liquid hydrocarbon fraction, the amount of liquid hydrocarbon fraction being selected so that the liquid hydrocarbon/liquid water ratio ranges between 1 and 20, whereby the dispersing additive disperses the water and hydrates in the liquid hydrocarbon faction.

2. A process as claimed in claim 1, wherein an amount of dispensing additive is added to the liquid hydrocarbon fraction so as to obtain a concentration ranging between 0.01 and 4% by weight.

3. A process as claimed in claim 1, wherein the mixture consisting of the dispensing additive and of the liquid hydrocarbon fraction is at least partly separated and said separated mixture part is recycled back to a point of the pipe.

4. A process as claimed in claim 1, comprising the following stages:
   (1) the mixture consisting of the dispersing additive in solution in said liquid hydrocarbon fraction is fed into the transmission pipe,
   (2) the mixture consisting of a gas phase, the water contained in the fluid, the added mixture and possibly hydrates formed is transported to a processing station,
   (3) at the pipe outlet, the mixture is separated as follows:
      the gas phase is at least partly separated from the rest of the mixture comprising the liquid hydrocarbon fraction and the additives in solution, the hydrates possibly formed during transportation and the water,
      the hydrates formed are dissociated so as to obtain a gas phase and an aqueous phase, then, after dissociation, the gas phase and the aqueous phase are separated from the liquid hydrocarbon phase containing the additive,
   (4) at least part of the liquid hydrocarbon phase containing the additive from stage (3) is recycled back to a point of the pipe.

5. A process as claimed in claim 4, wherein in case of a fluid likely to form an excess liquid hydrocarbon fraction in relation to the amount of liquid water, the liquid hydrocarbon fraction is separated in two stages:
   by obtaining at the end of the first stage, on the one hand, a water-concentrated suspension or emulsion and a liquid hydrocarbon fraction substantially cleared of water that is discharged, and
   by separating during a second stage the water contained in the emulsion or the suspension from the first stage from a liquid fraction enriched in dispersing additive and by recycling at least partly said liquid hydrocarbon fraction.

6. A process as claimed in claim 1, wherein the dispersing additive is a polyol and carboxylic acid ester, substituted or non-substituted.

7. A process as claimed in claim 6, wherein said polyol ester is obtained by at least one of reaction between an alkenylsuccinic acid or anhydride and a polyalkyleneglycol; reaction between a polyisobutenylsuccinic anhydride and a polyethyleneglycol; and action of polyalkyleneglycol monoether and of polyisobutenylsuccinic anhydride.

8. A process as claimed in claim 1, wherein the dispersing additive is at least one of a carboxylic acid hydroxycarbylamide, substituted or non-substituted and a carboxylic acid mono- or diethanolamide containing 3 to 6 carbon atoms.

9. A process as claim 1, wherein the mixture further comprises a thermodynamic inhibitor selected from the group consisting of methanol and the glycols.

10. A process as claimed in claim 1, wherein the mixture further comprises an additive making the wall of the pipe wettable by said liquid hydrocarbon fraction is fed into the pipe.

11. A process as claimed in claim 10, wherein the additive making the wall of the pipe wettable by the liquid hydrocarbon fraction is an anticorrosion additive.

12. A process as claimed in claim 1, wherein the liquid hydrocarbon fraction comprises constituents whose number of carbon atoms ranges between 5 and 30.

* * * * *